United States Patent Office 3,321,382
Patented May 23, 1967

3,321,382
PROCESS OF DISTILLING BENZOIC ACID WITH STEAM ABOVE 200° C.
Jacob O. Ashcraft, Jr., Hamburg, Leon O. Winstrom, East Aurora, Raymond J. Duggan, West Seneca, and Jong C. Park, Williamsville, N.Y., assignors to Allied Chemical Corporation, New York, N.Y., a corporation of New York
No Drawing. Filed Apr. 3, 1964, Ser. No. 357,306
8 Claims. (Cl. 203—34)

The present invention relates to a novel improvement in distilling benzoic acid. More particularly it relates an improved method of distilling benzoic acid at substantially atmospheric pressure and it is especially concerned with an improved method of obtaining benzoic acid suitable for conversion to cyclohexane carboxylic acid by catalytic hydrogenation.

It is known to prepare cyclohexane carboxylic acid, an important intermediate for caprolactam, by catalytic hydrogenation of benzoic acid. Generally, the benzoic acid is purified by distillation prior to hydrogenation to remove impurities such as iron, sulfur and halogen compounds, which have a deleterious effect on the rate and extent of the hydrogenation.

The prior art methods of distilling benzoic acid are generally unsatisfactory and/or costly. For example, distillation of benozic acid under diminished pressure, while generally providing a satisfactory product for catalytic hydrogenation, entails use of costly vacuum equipment, and, unless elaborate precautions are taken to exclude air, affords low yields and large quantities of still residue. Alternately, the distillation of benzoic acid under atmospheric pressure produces excessive amounts (10% by weight or more based on the charge of benzoic acid) of still residue and results in a product, which is hydrogenated at a relatively slow rate to cyclohexane carboxylic acid of low quality i.e., having a setting point below about 28° C. and a refractive index above about 1.4600 (40° C.).

It is the principal object of the present invention to devise an improved method of distilling benzoic acid at atmospheric pressure.

It is an additional object of the present invention to devise an improved method of preparing benzoic acid sutable for catalytic hydrogenation to cyclohexane carboxylic acid.

These and other objects and advantages will be apparent from the following description of our invention.

We have found that by carrying out the distillation of benzoic acid under substantially atmospheric pressure in the presence of steam at a temperature of at least about 200° C., the formation of still residue is inhibited and a benzoic acid distillate is obtained which is rapidly hydrogenated to cyclohexane carboxylic acid of improved quality.

The process of this invention is particularly useful in conjunction with the purification process described in copending U.S. patent applications, Ser. No. 93,868 (R. J. Duggan and L. O. Winstrom), "Process for Conditioning Reducible Cyclic Organic Compounds," filed Mar. 7, 1961 and now U.S. Patent No. 3,187,050 and Ser. No. 127,140 (L. O. Winstrom and O. E. Snider) "Cyclohexane Carboxylic Acid Produced by Hydrogenation of Molten Benzoic Acid," filed July 27, 1961, and now U.S. Patent 3,141,036 wherein benzoic acid is distilled from a mixture containing ethylenediamine tetraacetic acid and benzoic acid which has been heated for at least one and advantageously about 2 to 4 hours. The novel distillation process when used in conjunction with the aforementioned purification procedure gives an excellent result with crude benzoic acid obtained by the well known cobalt-catalyzed air oxidation of toluene.

Our novel process can be carried out in conventional apparatus by distilling benzoic acid in contact with steam under substantially atmospheric pressure and at a temperature of at least about 200° C. The steam can be introduced below the surface thereof since such procedure more effectively reduces formation of distillation residue. The mixture of steam and benzoic acid vapor produced is led to a condenser and cooled, advantageously to about 122–130° C. to provide a molten benzoic acid condensate without condensing the steam, and the latter if desired may be recycled to the distillaion pot. The small quantity of still restidue obtained in the present procedure generally contains about 20 to 80% by weight of benzoic acid and it can be redistilled to recover additional benzoic acid values. Alternately, the residue may be refluxed for about 15–60 minutes with dilute, e.g., about 5–10% aqueous sodium hydroxide in a baffled reaction vessel equipped with an impeller stirrer operating at 100–350 r.p.m. According to the method the reaction mass is filtered, the aqueous filtrate is acidified, and precipitated benzoic acid is recovered, e.g., by centrifugation.

The distillation of benzoic acid according to our invention is carried out preferably at temperatures of about 220° C. to about 250° C. using a flow of about from 0.22 part to about 0.01 part respectively of steam per part of benzoic acid distilling.

Under these preferred conditions the novel process produces from 30 to 70% by weight less still residue than is obtained by distillation under atmospheric pressure in the absence of steam. Further, the benzoic acid distillate is obtained in improved yield and quality. In comparison distillation of benzoic acid under ordinary atmospheric pressure at temperatures below 200° C. is unsatisfactory and requires large and costly amounts of steam, i.e. about 80 parts by weight of steam per part of benzoic acid distilled.

The benzoic acid thus obtained is eminently suited for catalytic hydrogenation to cyclohexane carboxylic acid by the methods described in the coassigned copending U.S. patent applications Ser. No. 127,140 filed July 27, 1961 and now U.S. Patent 3,141,036, and U.S. patent application Ser. No. 356,963, filed Apr. 2, 1964 (R. J. Duggan and L. O. Winstrom) "Improved Hydrogenation Process." Thus, for example, when benzoic acid is distilled according to this invention and hydrogenated in the molten state in the presence of a palladium catalyst according to the procedures of the aforesaid applications, the cyclohexane carboxylic acid is produced at a generally faster rate, and after removal of the catalyst by filtration, is of better quality than that obtained by hydrogenating benzoic acid distilled under atmospheric pressure in the absence of steam.

In the following examples which illustrate our invention, parts and percentages are by weight and temperatures are in degrees centigrade and refractive indices are determined at 40° C.

EXAMPLE 1

Part A.—Benzoic acid (960 parts, Baker and Adamson, reagent grade) is heated to reflux at atmospheric pressure in a conventional still equipped with a steam inlet tube and connected to an air-cooled vented receiver. Steam is introduced at 100° C. and at a rate of about 0.22 part per hour per part of benzoic acid distilling into the still above the molten benzoic acid. Distillation is carried out at a still head temperature of 225 to 250° and a pot temperature range from 247–254°. 881 parts corresponding to a 91.8% yield of benzoic acid is collected in the receiver. The still pot contains 28 parts of residue (3.1% based on weight of the benzoic acid charged). The benzoic acid distillate is hydrogenated at 180° to cyclohexane carboxylic acid substantially as described in Example 1 of U.S. Patent 3,141,036 noted above employing 4.4 parts of 5% palladium-on-charcoal catalyst, 100% excess hydrogen and a pressure of about 10 atmospheres. The results of this experiment are reported in Table I.

*Part B.*—The procedure of Part A is repeated by employing 1800 parts of benzoic acid as the distillation charge but omitting use of steam during the distillation. 1600 parts (88.8% yield) of distilled benzoic acid boiling at a still head temperature of 236–245° (corresponding to a still pot temperature of 257–280°) and 188 parts of still residue (10.4% of the benzoic acid charged) are obtained. The benzoic acid is converted to cyclohexane carboxylic acid according to the procedure described above. The results of this hydrogenation are set forth in Table I.

*Part C.*—The procedure of Part B is repeated omitting distillation of the benzoic acid. The results of this hydrogenation are reported in Table I.

Solvent stripping and conditioning treatments 0.25 part of ethylenediamine tetraacetic acid and 3.9 parts of benzoic acid recovered from distillation residue described below are mixed with 251.9 parts of a reaction product obtained by liquid phase air oxidation of toluene over cobalt acetate catalyst. The crude oxidation product has the following composition:

| | Percent |
|---|---|
| Benzoic acid | 37 |
| Toluene | 58.3 |
| Low boiling impurities | 3.34 |
| Benzyl benzoate | 0.15 |
| Benzoic acid anhydride | 0.26 |
| High-boiling impurities and residue | .97 |

The mixture is heated to 121–130° and introduced into a vertical still. Steam (15 parts) is introduced below the surface of the liquid mixture in the still. The toluene-water mixture which distills at a still head temperature of 110° (corresponding to a still pot temperature of 248–

TABLE I

| | Time required to provide substantially quantitative hydrogenation of benzoic acid to cyclohexane carboxylic acid, hours | Percent unreacted benzoic acid in product | Setting point of crude cyclohexane carboxylic acid product,* deg. | Refractive index at 40° C. of crude cyclohexane carboxylic acid product |
|---|---|---|---|---|
| Part A | 9½ | <1 | 30.0 | 1.4590 |
| Part B | 9½ | ---------- | 27.8 | 1.4610 |
| Part C | 10½ | <1 | 29–30 | 1.4590–1.4600 |

*Directly as obtained after removal of the catalyst by filtration. The setting point and refractive index of pure cyclohexane carboxylic acid are 31.4° and 1.4555 respectively.

EXAMPLE 2

5556 parts of a toluenebenzoic acid mixture, containing about 59% benzoic acid obtained via liquid phase air oxidation of toluene over cobalt acetate catalyst and 8.7 parts of N,N′,N″,N‴-ethylenediaminetetraacetic acid (Sequestrene AA) are charged to the still described in Example 1, Part A. The mixture is heated to 175° and 2112 parts of toluene are removed by distillation. Introduction of steam is started and maintained during the reflux and distillation operations at an average rate of 27 parts per hour. The mixture is maintained and agitated at 175–197° for 4 hours under atmospheric pressure during which residual toluene distills with steam. The mass is then heated to 246° and low boiling organic impurities are distilled and collected as a forecut (89 parts) boiling at about 235° (still head temperature, corresponding to a still pot temperature of about 246–247°). A main fraction of 2930 parts of benzoic acid distilling at an average rate of 700 parts per hour and boiling at 247–249° (still head temperature corresponding to a still pot temperature of 247–270°) is then collected. A second fraction (182 parts) of benzoic acid distilling at an average rate of 326 parts/hour and boiling at 237–265° (still head temperature corresponding to a still pot temperature of 270–300°) is collected thereafter. Approximately 243 parts of still residue (about 7.5% of the benzoic acid content of the charge) is obtained.

The combined benzoic acid distillates (3112 parts, 87.5% yield) are hydrogenated at 240° substantially as described in Example 3 of aforesaid U.S. patent application Ser. No. 356,963 employing hydrogen saturated with water. The hydrogenation requires 3 hours, 10 minutes, and provides a substantially quantitative yield of cyclohexane carboxylic acid having a setting point of 28.4° and a refractive index of 1.4595.

EXAMPLE 3

The following example illustrates distillation of benzoic acid on a continuous basis. Parts are by weight per hour and all distillations are operated at atmospheric pressure using steam of substantially 100° C.

250°) is condensed. The upper toluene layer of the distillate is separated and recycled for further oxidation. The lower phase (15 parts) an aqueous low-boiling impurity fraction, is passed to the hydrolysis unit described below. The stripped distilland (104.2 parts) is flowed to an agitated holding tank where it is mixed with a high boiling benzoic acid distillate (2.1 part) obtained in a later stage and held therein at 130–170° for a residence time of about two hours.

Distillation of benzoic acid

The mixture (106.3 parts) is then conducted to a second vertical still wherein steam (15 parts) is introduced below the surface of the distillation charge. A low boiling impurity fraction (3.1 parts) boiling at a still head temperature of 222–235° (corresponding to a still pot temperature of 248–250°) is condensed in a partial condenser at 130–150° C. and the effluent vapors are condensed, passed through an oil separator, to separate an oily layer of impurities from the aqueous layer which is then vaporized and recycled to the toluene still. The distilland (102 parts) flows from the bottom of the second still to a third vertical still, wherein steam (15 parts) is introduced below the liquid surface. Benzoic acid (93.2 parts, corresponding to a yield of 99% of theory) distills at a still head temperature of 232–235° (corresponding to a still pot temperature of 280°) is condensed at about 130° C. in a partial condenser and collected as a liquid. Effluent steam is condensed, vaporized and recycled to the second still.

Recovery of benzoic acid from distillation residue

The residue (8.71 parts) obtained in the third still is contacted with 1 part of steam in a thin film residue stripping unit (Kontro Corporation) maintained at 295°. The vapors are passed through a packed column to a partial condenser maintained at 130–150° wherein a benzoic acid fraction (2.1 parts) is condensed and recycled to the holding tank described above. The residue (6.6 parts) from the stripping unit is combined with (1) the aqueous low-boiling impurity fraction from the toluene still, (2) the distillate from the second still, (3) 1.89 parts of sodium hydroxide and (4) 15.9 parts of water. The mixture is agitated (at 102–103°) in a baffled vessel with an impeller operating at 100–350 r.p.m. at a residence time of about one hour. The aqueous product (42.5 parts) flowing from the bottom of the vessel is filtered to remove tar (1.95 parts) and the ethylenediamine tetraacetic acid. The filtrate is acidified at 40–50° by addition of 2.53 parts sulfuric acid and 13.1 parts of water and then centrifuged to recover the precipitated benzoic acid. The wet benzoic acid thus obtained (6.28 parts) is charged to a recovery still heated at 295°. Water condensate (1 part) produced from the aqueous effluent of the thin film residue stripping unit is introduced below the surface of molten acid. The benzoic acid distills at 234–235° through a packed column and is condensed and combined with the charge to the toluene still. Effluent steam from the recovery still is condensed and recycled to the acidification stage.

Hydrogenation of benzoic acid

The benzoic acid distillate thus obtained is hydrogenated at 180° substantially as described in Example 1 of aforesaid U.S. Patent application Ser. No. 356,963 employing hydrogen saturated with water. The hydrogenation requires 8.5 hours and provides a substantially quantitative yield of cyclohexane carboxylic acid (after removal of catalyst by filtration) having a setting point of 30.0° and a refractive index of 1.4590.

EXAMPLE 4

*Part A.*—The process of Example 3 is repeated substantially as described except that the steps of recovering and recycling benzoic acid from the distillation residue are omitted. A 95% yield of benzoic acid is obtained. This distillate is catalytically hydrogenated according to the method of Example 1 and in a reaction time of 7.5 hours provides a substantially quantitative yield of crude cyclohexane carboxylic acid (after removal of catalyst by filtration) having a setting point of 28.6° and a refractive index of 1.4570.

*Part B.*—The procedure described in part A above is repeated omitting use of steam in the distillation stages. The catalytic hydrogenation of the distilled benzoic acid obtained requires 14.5 hours and affords crude cyclohexane carboxylic acid of inferior quality.

We claim:

1. A process for distilling benzoic acid to recover purified benzoic acid as a product and to minimize formation of high-boiling distillation residue, which comprises distilling the benzoic acid at a temperature above about 200° C. in the presence of about 0.22 to 0.01 parts by weight of steam per part by weight of distilling benzoic acid.

2. A process for distilling benzoic acid, useful for the production of cyclohexane carboxylic acid obtained by catalytic hydrogenation of molten benzoic acid which comprises distilling the benzoic acid at a temperature above about 200° C. in the presence of about 0.22 to 0.01 part by weight of steam per part by weight of distilling benzoic acid.

3. The process of claim 2 wherein the benzoic acid subjected to distillation is an impure product obtained by liquid phase oxidation of toluene in the presence of a cobalt catalyst.

4. A process for distilling benzoic acid to recover purified benzoic acid as a product and to minimize formation of high-boiling distillation residue, which comprises heating the benzoic acid above its melting point for at least one hour with ethylene diamine tetraacetic acid and subsequently distilling the benzoic acid at a temperature above about 200° C. in the presence of about 0.22 to 0.01 part by weight of steam per part by weight of distilling benzoic acid.

5. A process for distilling benzoic acid useful for the production of cyclohexane carboxylic acid obtained by catalytic hydrogenation of benzoic acid which comprises distilling benzoic acid at a temperature of about 220° C.–250° C. in the presence of steam and under substantially atmospheric pressure.

6. A process for distilling benzoic acid to recover purified benzoic acid as a product and to minimize formation of high-boiling distillation residue which comprises distilling benzoic acid at a temperature of about 220° C. to 250° C. in the presence of steam and under substantially atmospheric pressure.

7. A process for distilling benzoic acid obtained by liquid phase oxidation of toluene in the presence of a cobalt catalyst to recover purified benzoic acid as a product and to minimize formation of high boiling distillation residue which comprises distilling said benzoic acid at a temperature above 200° C. under substantially atmospheric pressure in the presence of about 0.22 to 0.01 part by weight of steam per part by weight of distilling benzoic acid.

8. A process as defined in claim 7 wherein said benzoic acid is distilled at a temperature of about 220° C. to 250° C.

References Cited by the Examiner
UNITED STATES PATENTS

| | | | |
|---|---|---|---|
| 1,686,913 | 10/1928 | Jaeger | 260—525 |
| 2,252,117 | 8/1941 | Conover | 260—525 |
| 2,317,455 | 4/1943 | Gubelmann | 260—525 |
| 3,141,036 | 7/1964 | Winstrom et al. | 260—514 |
| 3,187,050 | 1/1965 | Duggan et al. | 260—582 |
| 3,210,416 | 10/1965 | Fragen et al. | 260—525 |
| 3,235,588 | 2/1966 | Weaver | 260—525 |

NORMAN YUDKOFF, *Primary Examiner.*

WILBUR L. BASCOMB, Jr., *Examiner.*